US006905046B2

(12) United States Patent
Coughlin et al.

(10) Patent No.: US 6,905,046 B2
(45) Date of Patent: Jun. 14, 2005

(54) VIAL GRIPPING MECHANISM FOR AUTOMATIC MEDICAMENT DISPENSING MACHINE

(75) Inventors: Shane P. Coughlin, Kansas City, MO (US); Michael E. Coughlin, Mission Hills, KS (US); Stacy Orr, Shawnee, KS (US); Timothy Surgeon, Archie, MO (US)

(73) Assignee: ScriptPro LLC, Mission, KS (US)

( * ) Notice: Subject to any disclaimer, the term of this patent is extended or adjusted under 35 U.S.C. 154(b) by 157 days.

(21) Appl. No.: 10/440,298

(22) Filed: May 16, 2003

(65) Prior Publication Data

US 2003/0194306 A1 Oct. 16, 2003

Related U.S. Application Data (63) Continuation of application No. 10/040,824, filed on Jan. 7, 2002, now Pat. No. 6,578,734.

(51) Int. Cl.[7] .............................................. A01C 9/00
(52) U.S. Cl. ...................................... 221/219; 294/104
(58) Field of Search .............................. 221/7, 13, 219, 221/294, 131; 294/99.1, 104, 901

(56) References Cited

U.S. PATENT DOCUMENTS 6,477,442 B1 * 11/2002 Valerino, Sr. ............... 700/213

* cited by examiner

Primary Examiner—Kenneth W. Noland
(74) Attorney, Agent, or Firm—Hovey Williams LLP (57) ABSTRACT

A vial gripping mechanism (10) includes a pivotally mounted swing arm (26). A sensor receiving array (44) is mounted to a sensor end (34) on an inward edge (46) of the arm (26). A channel (38) protecting a cable (64) follows an outside edge (42) from the receiving array (44) to a cam end (36). A torsion spring (28) forces the cam end (36) against a cam (30) which is fixedly mounted to the mechanism (10) adjacent the arm (26). By action of the mechanism (10), the arm (26) is moved relative to the cam (30) such that in a sensing position, the receiving array (44) is directly opposite a sensor transmitting array (74), and in a shielded position, the receiving array (44) is housed within a shield (32). The shield (32) is fixedly mounted to the mechanism (10) and protects the receiving array (44) while in transit.

18 Claims, 6 Drawing Sheets

FIG. 7

VIAL GRIPPING MECHANISM FOR AUTOMATIC MEDICAMENT DISPENSING MACHINE

RELATED APPLICATIONS

The present application is a continuation and claims priority benefit, with regard to all common subject matter, of an earlier-filed U.S. patent application titled "VIAL GRIPPING MECHANISM FOR AUTOMATIC MEDICAMENT DISPENSING MACHINE", Ser. No. 10/040,824, filed Jan. 7, 2002 now U.S. Pat. No. 6,578,734. The identified earlier-filed application is hereby incorporated by reference into the present application.

BACKGROUND OF THE INVENTION

1. Field of the Invention

The present invention relates to vial gripping mechanisms for use with automatic medicament dispensing machines. More particularly, the invention relates to a vial gripping mechanism for use with an automatic medicament dispensing machine configured to protect a sensor within the machine.

2. Description of Prior Art

In an effort to improve efficiency, accuracy, and profitability, pharmacies increasingly use automatic medicament dispensing machines to fill prescriptions. Such dispensing machines typically include a pill count sensor for counting pills, tablets, capsules, or other countable medicaments. The pill count sensor is carried by a vial gripping mechanism which retrieves an empty vial and then positions the vial and the pill count sensor next to a pill dispenser so the vial may be filled with pills. The pill count sensor can include a sensor transmitting array and a sensor receiving array.

As these machines grow more sophisticated and complex, they become more dependant upon pill count sensors and other sensors. Unfortunately, pill count sensors are sensitive devices and can be easily damaged and/or un-calibrated if impacted by other objects within the machine, such as vials.

This sometimes occurs when a vial dispenser in the machine improperly feeds a vial, causing it to hang improperly. When this happens, the vial is not in the exact position that the vial-gripping mechanism expects, causing a collision between the vial gripping mechanism and the vial which can result in damage to the pill count sensor.

The likelihood of such collisions is increased by the design of some pill count sensors. Particularly, in some sensors, the sensor receiving array must be sufficiently separated from the sensor transmitting array so as to insure that pills are allowed to fall freely therebetween. This can necessitate the sensor receiving array being located well beyond the confines of the vial gripping mechanism. Extended in such a manner, the sensor receiving array can also impact objects, such as, improperly seated pill dispensers.

Such collisions may also result from standard maintenance on the machines. It is common for technicians to work on machines while they are running to perform tests and/or replenish pill dispensers. While doing so, the vial gripping mechanism may be moving, which increases the risk of it impacting objects.

Accordingly, there is a need for an improved vial gripping mechanism for use with an automatic medicament dispensing machine that overcomes the limitations of the prior art.

SUMMARY OF THE INVENTION

The present invention overcomes the above-identified problems and disadvantages and provides a distinct advance in the art of vial gripping mechanisms for use with automatic medicament dispensing machines. More particularly the present invention provides a vial gripping mechanism for use with an automatic medicament dispensing machine configured to protect a sensor within the machine.

The preferred vial gripping mechanism broadly comprises a first rotatable jaw, a second jaw coupled with an output shaft of a jaw motor and operable to rotate toward the first jaw, a swing arm rotatably secured to the vial gripping mechanism, a torsion spring operable to push the swing arm against a cam, and a shield fixedly mounted to the vial gripping mechanism. In an open position, the jaws are spaced apart to accept a vial therebetween. Actuation of the jaw motor causes rotation of the second jaw toward the first jaw thereby gripping the vial in a gripping position. Continued rotation of the second jaw causes rotation of the first jaw and any vial therebetween to a dispensing position for dispensing medicaments into the vial.

The swing arm includes a sensor end and a cam end with a channel in a bottom surface. A sensor receiving array of the pill count sensor is mounted to the sensor end on an inside edge of the swing arm.

The channel follows an outside edge of the swing arm from the sensor receiving array to the cam end. The channel protects a fiber optic cable connected to the sensor receiving array by surrounding the cable on three sides. The sensor receiving array and the cable are secured to the swing arm by potting them in place.

The torsion spring includes a coil flanked by an arm member and a frame member. The coil, the swing arm, and a sensor transmitting array of the pill count sensor are allowed to pivot about a pin which is fixedly mounted to the first jaw. The arm member applies force to the swing arm, while the frame member applies an equal force to the sensor transmitting array, such that the cam end of the swing arm is pushed toward the cam.

The cam is fixedly mounted to the vial gripping mechanism adjacent the arm. Moving the jaws into the dispensing position rotates the swing arm relative to the cam such that in a sensing position, the sensor receiving array is directly opposite the sensor transmitter, and in a shielded position, the sensor receiving array is housed within the shield.

The shield is formed into a trough which is fixedly mounted to the vial gripping mechanism. The shield protects the sensor transmitting array, when the swing arm is in the shielded position.

In use, when a prescription is received, a computing device of the automatic medicament dispensing machine instructs the vial gripping mechanism to move to a vial dispenser, with the swing arm in the shielded position. The vial gripping mechanism grips a vial in the gripping position and then moves to a medicament dispenser. The vial gripping mechanism moves the vial to the dispensing position and the swing arm to the sensing position. The automatic medicament dispensing machine dispenses pills as the pill count sensor counts the pills. Once an appropriate number of the pills has been counted, the automatic medicament dispensing machine stops dispensing pills. Then the vial gripping mechanism moves the vial back to the gripping position and the swing arm back to the shielded position. The vial gripping mechanism thus transports the vial to a discharge conveyor, thereby protecting the sensor receiving array while in transit.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
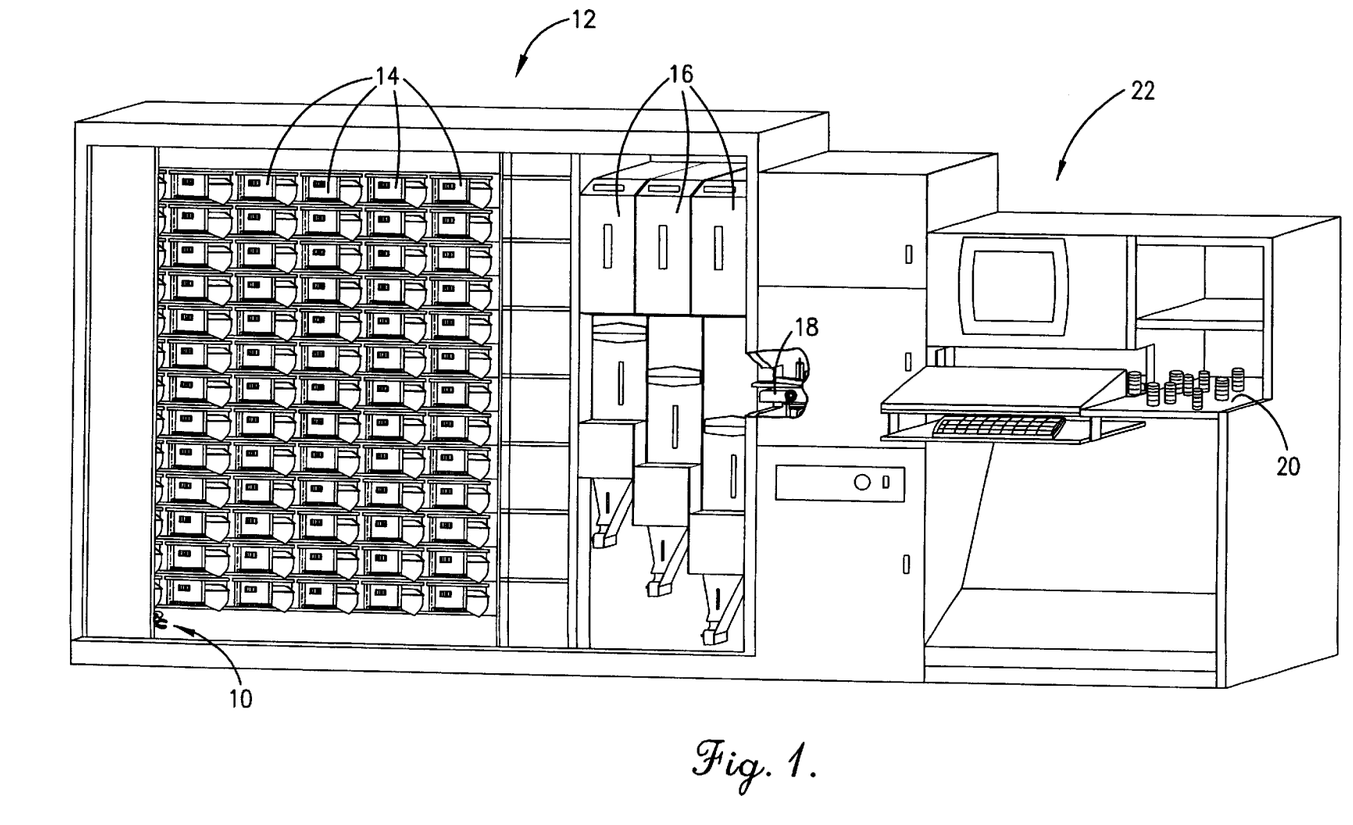
FIG. 1 is a perspective view of an automatic medicament dispensing machine in which a vial gripping mechanism of the present invention may be used.

FIG. 1 illustrates a preferred vial gripping mechanism 10 in accordance with the present invention shown in the preferred environment of use as part of an automatic medicament dispensing machine 12 such as that illustrated in U.S. Pat. No. 5,337,919, incorporated herein by reference. As shown, the machine 12 also includes a plurality of medicament dispensers 14 for storing and dispensing pills, a plurality of vial dispensers 16 for storing and dispensing empty vials, and a discharge conveyor 18 for conveying filled vials through a labeler to a discharge station 20, all controlled by a computing device 22 under the direction of computer programming.

The vial gripping mechanism 10 moves within the automatic medicament dispensing machine 12 to retrieve empty vials from the vial dispensers 16 and transport the empty vials to the medicament dispensers 14 in order to fill a prescription. The vial gripping mechanism 10 also transports filled vials to the discharge conveyor 18 so that they can be labeled and presented at the discharge station 20.

Figure 2:
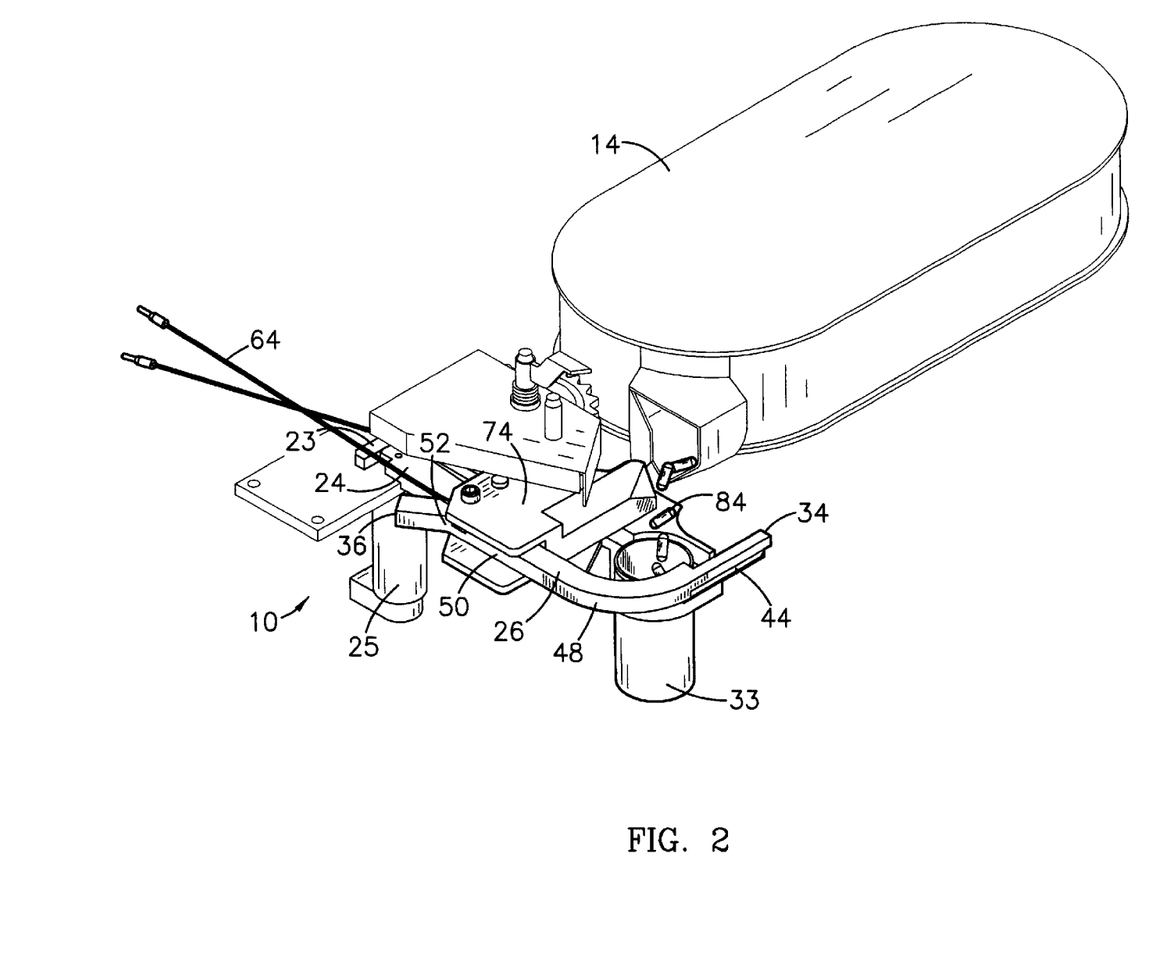
FIG. 2 is a perspective view of a portion of a preferred embodiment of the vial gripping mechanism with a swing arm in a sensing position.
Figure 3:
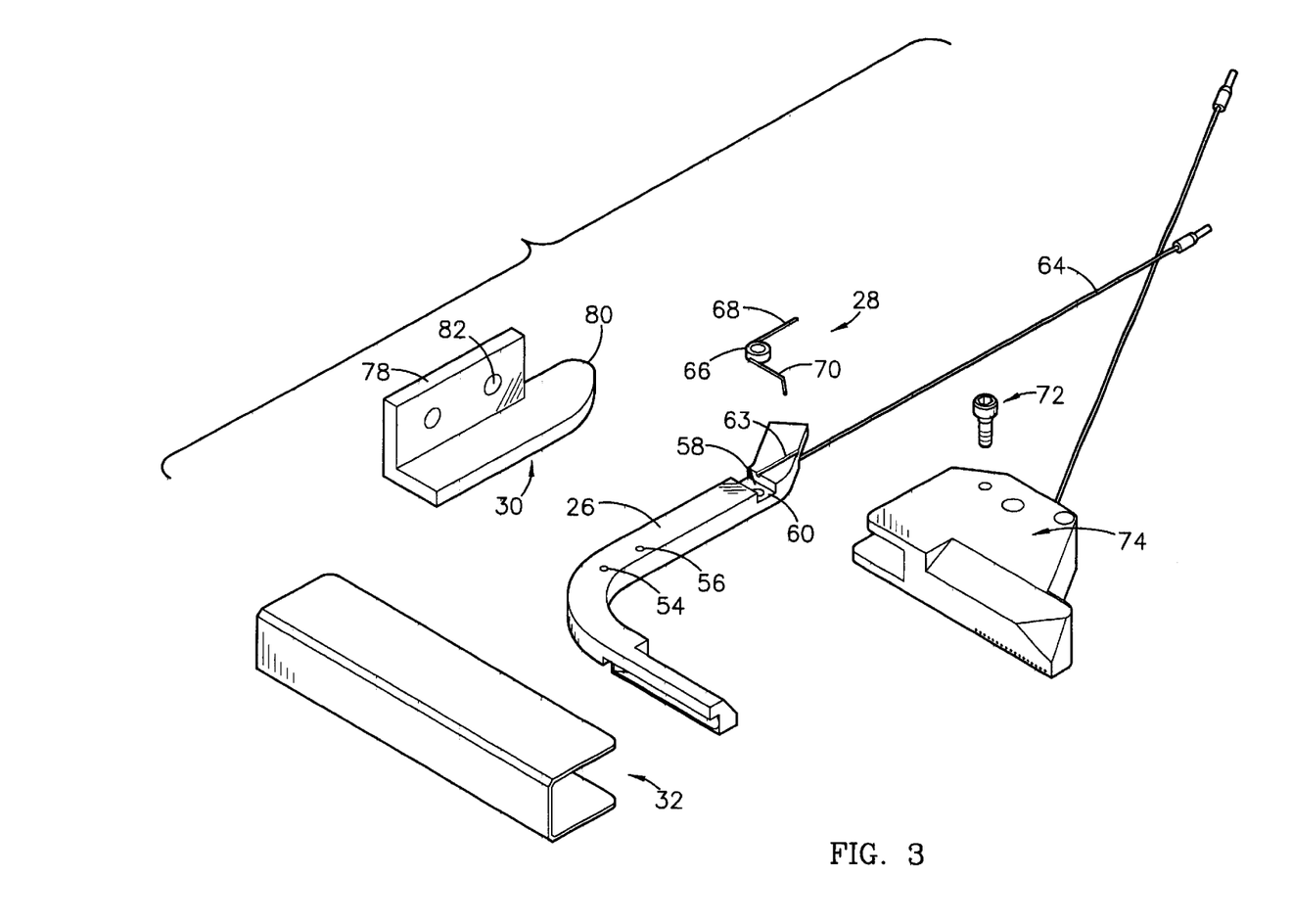
FIG. 3 is an exploded view of a portion of the vial gripping mechanism.

Also referring to FIG. 2 and FIG. 3, the preferred vial gripping mechanism 10 broadly comprises a first rotatable jaw 23, a second jaw 24 coupled with an output shaft of a jaw motor 25 and operable to rotate toward the first jaw 23, a swing arm 26 rotatably secured to the first jaw 23, a torsion spring 28 operable to push the swing arm 26 against a cam 30, and a shield 32 fixedly mounted to the vial gripping mechanism 10. In an open position, the jaws 23,24 are spaced apart to accept a vial 33 therebetween. Actuation of the jaw motor 25 causes rotation of the second jaw 24 toward the first jaw 25 thereby gripping the vial 33. The vial 33 is thus held and transported in a gripping position. Continued rotation of the second jaw 24 causes rotation of the first jaw 23 and any vial 33 therebetween to a dispensing position for dispensing medicaments into the vial 33 from an adjacent one of the medicament dispensers 14.

Figure 4:
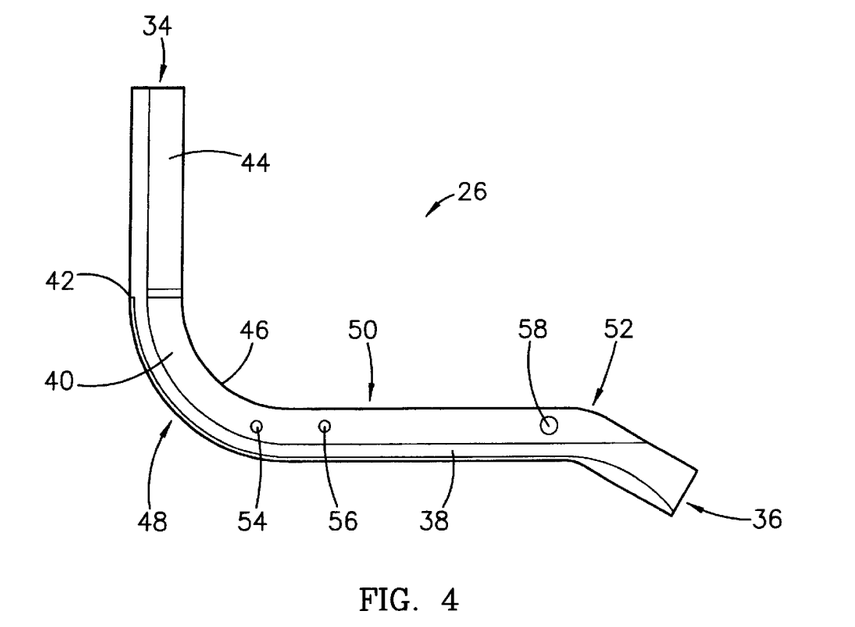
FIG. 4 is a plan view of a top surface of the swing arm of the vial gripping mechanism.
Figure 5:
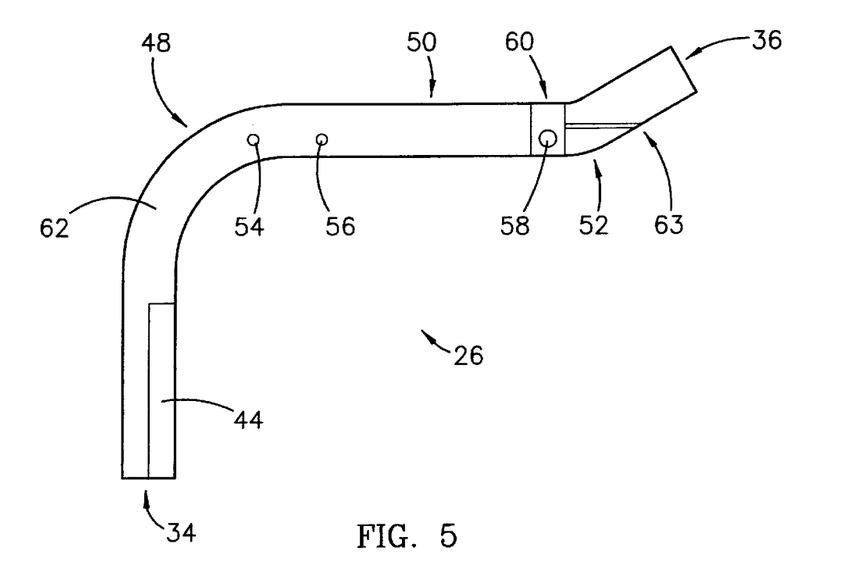
FIG. 5 is a plan view of a bottom surface of the swing arm.

Referring also to FIG. 4 and FIG. 5, the swing arm 26 is preferably formed from plastic as a single unit approximately one half inch wide and approximately one quarter inch thick. The swing arm 26 includes a sensor end 34, a cam end 36, and a channel 38 in a bottom surface 40 running along an outside edge 42. The sensor end 34 has a sensor receiving array 44 of a pill count sensor mounted on an inside edge 46. The sensor receiving array 44 is approximately one half inch tall, approximately one fifth of an inch thick, and extends from the sensor end 34 approximately one and one quarter inches toward the cam end 36. The sensor receiving array 44 is more fully disclosed in a co-pending application entitled "Pill Count Sensor for Automatic Medicament Dispensing Machine" Ser. No. 10/040,823 filed Jan. 7, 2002, hereby incorporated into the present application by reference.

Approximately one half inch from the sensor receiving array 44, the swing arm 26 begins an approximately ninety degree first arc 48 with an approximately one inch radius. A main body 50 of the swing arm 26 extends approximately two and one half inches from the first arc 48 to a second arc 52. The main body 50 includes a first hole 54 and a second hole 56 substantially perpendicular to the bottom surface 40. The first hole 54 is located approximately where the first arc 48 adjoins the main body 50. The second hole 56 is located approximately one half inch from the first hole 54. The first and second holes 54,56 are each approximately one sixteenth of an inch in diameter and slightly offset towards the inside edge 46.

The main body 50 further includes a third hole 58 substantially perpendicular to the bottom surface 40 and located adjacent the second arc 52. The third hole 58 is approximately one eighth of an inch in diameter and slightly offset towards the inside edge 46. At the third hole 58, the swing arm 26 includes a cut-out section 60 in a top surface 62 approximately one quarter inch wide and approximately one eighth of an inch deep running perpendicular to the main body 50.

The second arc 52 is approximately thirty degrees with an approximately one inch radius and offsets the cam end 36 opposite the sensor end 34. The cam end 36 is approximately three quarter inches long and includes a groove 63 cut into the top surface 62. The groove 63 is approximately one sixteenth of an inch wide and one eighth of an inch deep and runs perpendicularly from the cut-out section 60 toward the cam end 36.

The channel 38 is approximately one tenth of an inch wide and approximately one tenth of an inch deep. The channel 38 follows the outside edge 42 from the sensor receiving array 44 to the cam end 36. The channel 38 protects a fiber optic cable 64 connected to the sensor receiving array 44 by surrounding the cable 64 on three sides. The sensor receiving array 44 and the cable 64 are secured to the swing arm 26 by potting them in place.

The torsion spring 28 is made of approximately one sixteenth of an inch diameter spring steel and includes a coil 66 flanked by an arm member 68 and a frame member 70. The coil 66 is recessed in the cut-out section 60 and secured by a pin 72. The pin 72 penetrates a sensor transmitting array 74 of the pill count sensor and the swing arm 26 through the third hole 58. The torsion spring 28, the swing arm 26, and the sensor transmitting array 74 are allowed to pivot about the pin 72 which is fixedly mounted to the first jaw 23. The arm member 68 is recessed in and applies force to a sidewall of the groove 63, while the frame member 70 applies an equal force to the sensor transmitting array 74, such that the cam end 36 of the swing arm 26 is pushed toward the cam 30.

The cam 30 is preferably formed from plastic as a single unit approximately three quarter inches wide and approximately one quarter inch thick. The cam 30 includes a flange 78 and an arcuate end 80. The cam 30 is fixedly mounted to the vial gripping mechanism 10 adjacent the swing arm 26 by securing a fastener through each of two penetrations 82 in the flange 78.

As described above, actuation of the jaw motor 25 causes the jaws 23,24 to rotate to the dispensing position. This action also moves the swing arm 26 relative to the arcuate end 80 of the cam 30. As the first jaw rotates to the dispensing position the pin 72 moves with it, causing the swing arm 26 to rotate about the pin 72 such that in a sensing position, the sensor receiving array 44 is directly opposite the sensor transmitting array 74, and in a shielded position, the sensor receiving array 44 is housed within the shield 32.

The shield 32 is preferably constructed of a single piece of approximately one eighth of an inch thick steel. The steel is approximately three inches wide by approximately three inches long with rounded corners. The shield 32 is configured by forming the steel into a trough such that the trough is approximately one inch deep and approximately one inch wide. The shield 32 is fixedly mounted to the vial gripping mechanism 10.

In operation, a technician or other operator utilizes the computing device 22 of the automatic medicament dispensing machine 12 to initiate a prescription filling process. Once a prescription is received, the computing device 22 instructs the vial gripping mechanism 10 to move to one of the vial dispensers 16 with the swing arm 26 in the shielded position. The vial gripping mechanism 10 grips the vial 33 in the gripping position and then moves to one of the medicament dispensers 14.

Figure 6:
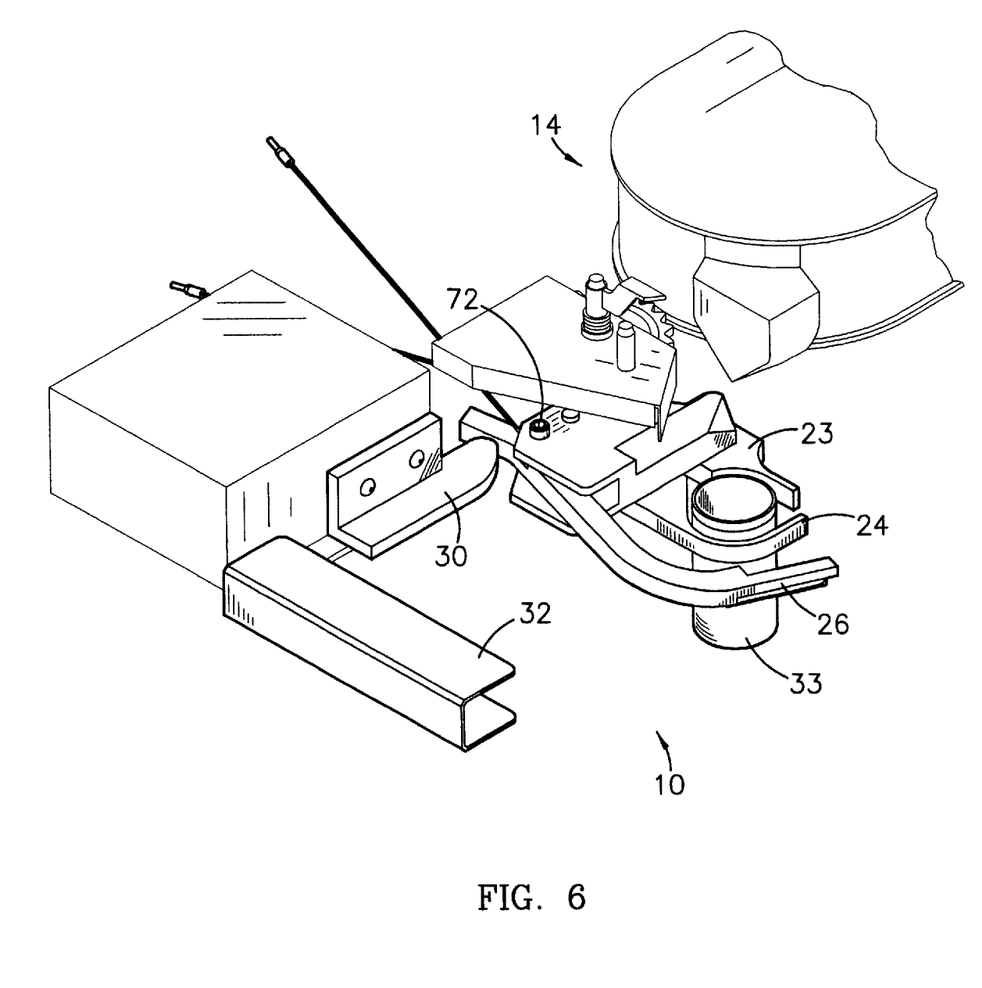
FIG. 6 is a perspective view of the vial gripping mechanism with the swing arm between the sensing position and a shielded position.
Figure 7:
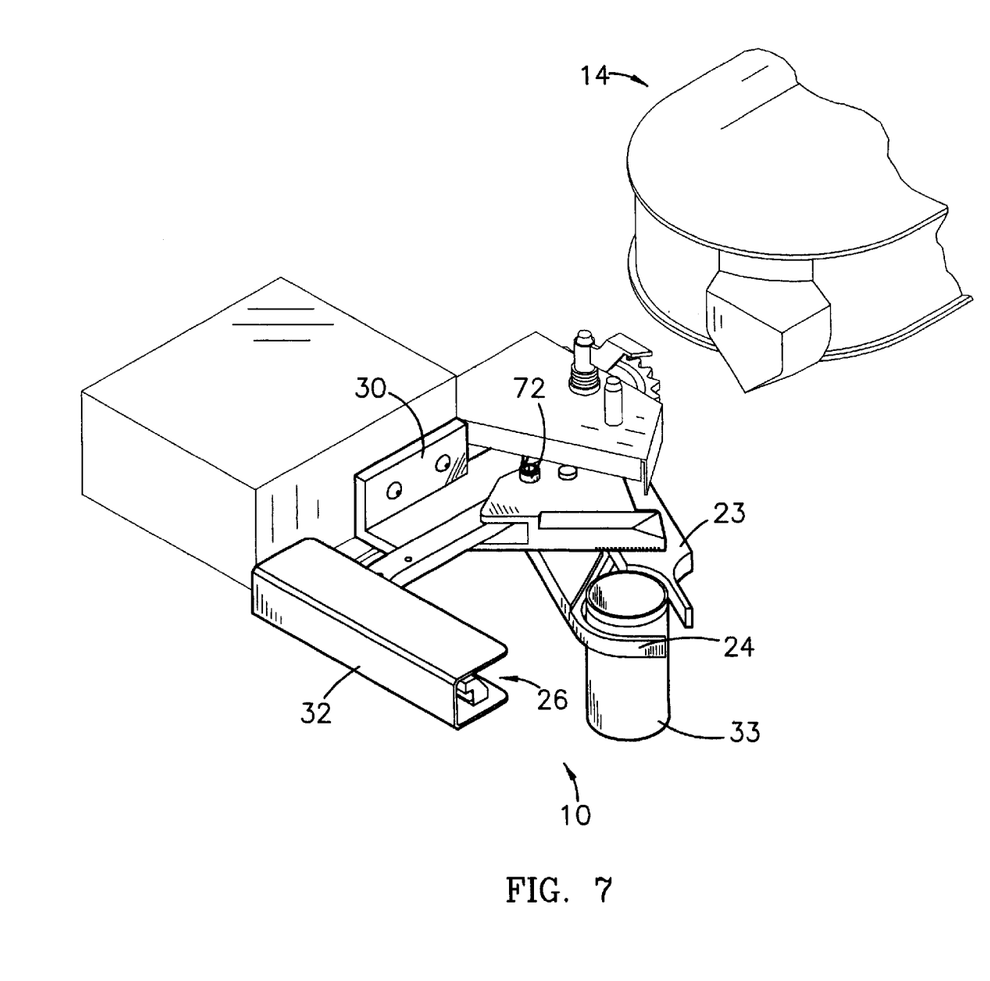
FIG. 7 is a perspective view of the vial gripping mechanism with the swing arm in the shielded position.

As shown in FIG. 6 and FIG. 7, the vial gripping mechanism 10 moves the vial 33 to the dispensing position and the swing arm 26 to the sensing position. The automatic medicament dispensing machine 12 dispenses a plurality of pills 84 into the vial 33 as the pill count sensor counts the pills 84. Once an appropriate number of the pills 84 has been counted, the automatic medicament dispensing machine 12 stops dispensing pills 84. Then the vial gripping mechanism 10 moves the vial 33 back to the gripping position and the swing arm 26 back to the shielded position. The vial gripping mechanism 10 thus transports the vial 33 to the discharge conveyor 18, thereby protecting the sensor receiving array 44 while in transit.

It will be appreciated that the transmitting array 74 could be mounted to the sensor end 34 with the sensor receiving array 44 fixedly mounted to the vial gripping mechanism 10. Additionally, while the preferred embodiment of the present invention has been described above, it is understood that other materials and/or dimensions can be substituted, as a matter of design choice. These and other minor modifications are with the scope of the present invention.

Having thus described a preferred embodiment of the invention, what is claimed as new and desired to be protected by Letters Patent includes the following:

1. A vial gripping mechanism operable to carry a sensor for use in an automatic medicament dispensing machine, the mechanism comprising:
   a first rotatable jaw;
   a second jaw operable to rotate toward the first jaw thereby gripping a vial;
   a rotatable swing arm rotatably secured to one of the jaws; and
   a motor coupled with the second jaw and operable to rotate the second jaw toward the first jaw thereby rotating the first jaw and the swing arm.

2. The mechanism as set forth in claim 1, wherein at least a portion of the sensor is affixed to a sensor end of the swing arm.

3. The mechanism as set forth in claim 1, wherein the swing arm includes a channel which protects a cable of the sensor by surrounding the cable on at least three sides.

4. The mechanism as set forth in claim 1, further including a cam operable to cause rotation of the swing arm.

5. The mechanism as set forth in claim 4, further including a torsion spring recessed into the swing arm and operable to push a cam end of the swing arm against the cam.

6. The mechanism as set forth in claim 4, wherein the motor is further operable to move the swing arm relative to the cam such that the sensor end is rotated between a shielded position and a sensing position.

7. The mechanism as set forth in claim 6, further including a shield which surrounds a sensor end of the swing arm on at least three sides when the swing arm is in the shielded position.

8. A vial gripping mechanism operable to carry a sensor for use in an automatic medicament dispensing machine, the mechanism comprising:
   a first rotatable jaw;
   a second jaw operable to rotate toward the first jaw thereby gripping a vial;
   a rotatable swing arm;
   a cam operable to cause rotation of the swing arm; and
   a motor operable to move the swing arm relative to the cam in order to rotate the swing arm.

9. The mechanism as set forth in claims 8, wherein at least a portion of the sensor is affixed to a sensor end of the swing arm.

10. The mechanism as set forth in claim 8, wherein the swing arm includes a channel which protects a cable of the sensor by surrounding the cable on at least three sides.

11. The mechanism as set forth in claim 8, further including a torsion spring recessed into the swing arm and operable to push a cam end of the swing arm against the cam.

12. The mechanism as set forth in claim 8, further including a shield which surrounds a sensor end of the swing arm on at least three sides when the swing arm is in a shielded position.

13. A medicament dispensing machine for dispensing and counting countable medicaments, the medicament dispensing machine comprising:
   a plurality of medicament dispensers operable to store and dispense medicaments;
   a plurality of vial dispensers operable to store and dispense empty vials;
   a sensor receiving array and a sensor transmitting array together operable to aid in counting medicaments; and
   a vial gripping mechanism operable to move within the machine, the mechanism including—
   first rotatable jaw,
   a second jaw operable to rotate toward the first jaw thereby gripping a vial,
   a rotatable swing arm rotatably secured to one of the jaws and operable to carry at least a portion of the sensor, and
   a motor coupled with the second jaw and operable to rotate the second jaw toward the first jaw thereby rotating the first jaw and the swing arm.

14. The machine as set forth in claim 13, wherein the swing arm includes a channel which protects a cable of the sensor by surrounding the cable on at least three sides.

15. The machine as set forth in claim 13, further including a cam.

16. The machine as set forth in claim 15, further including a torsion spring recessed into the swing arm and operable to push a cam end of the swing arm against the cam.

17. The machine as set forth in claim 15, wherein the motor is further operable to move the swing arm relative to the cam such that the sensor end is rotated between a shielded position and a sensing position.

18. The machine as set forth in claim 17, further including a shield which surrounds a sensor end of the swing arm on at least three sides when the swing arm is in the shielded position.

* * * * *